(12) United States Patent
Lai et al.

(10) Patent No.: US 12,081,109 B2
(45) Date of Patent: Sep. 3, 2024

(54) SWITCHING CONVERTER AND CONTROL CIRCUIT THEREOF

(71) Applicant: Silergy Semiconductor Technology (Hangzhou) LTD, Zhejiang (CN)

(72) Inventors: Hongbin Lai, Hangzhou (CN); Jianxin Wang, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 318 days.

(21) Appl. No.: 17/542,723

(22) Filed: Dec. 6, 2021

(65) Prior Publication Data
US 2022/0190704 A1 Jun. 16, 2022

(30) Foreign Application Priority Data
Dec. 14, 2020 (CN) .......................... 202011467221.1

(51) Int. Cl.
*H02M 3/335* (2006.01)
*H02M 1/00* (2006.01)

(52) U.S. Cl.
CPC ..... *H02M 1/0058* (2021.05); *H02M 3/33507* (2013.01)

(58) Field of Classification Search
CPC ........... H02M 1/0058; H02M 3/33507; H02M 3/33569
See application file for complete search history.

(56) References Cited

U.S. PATENT DOCUMENTS

| | | | |
|---|---|---|---|
| 6,005,780 A | 12/1999 | Hua | |
| 6,580,258 B2 | 6/2003 | Wilcox et al. | |
| 9,325,254 B2 | 4/2016 | Deng et al. | |
| 9,331,588 B2 | 5/2016 | Chen | |
| 9,488,680 B2 | 11/2016 | Xu | |
| 11,031,876 B1* | 6/2021 | Li | H02M 3/33569 |
| 2014/0078789 A1 | 3/2014 | Li et al. | |
| 2014/0239934 A1 | 8/2014 | Zhang | |
| 2015/0160270 A1 | 6/2015 | Shi et al. | |
| 2015/0280578 A1 | 10/2015 | Huang et al. | |
| 2016/0020699 A1 | 1/2016 | Shen et al. | |
| 2018/0301975 A1* | 10/2018 | Lin | H02M 3/33569 |
| 2019/0036446 A1* | 1/2019 | Yang | H02M 1/34 |
| 2020/0091826 A1* | 3/2020 | Yang | H02M 3/33515 |
| 2020/0328669 A1* | 10/2020 | Yang | H02M 1/32 |

FOREIGN PATENT DOCUMENTS

| | | |
|---|---|---|
| CN | 108809107 B | 11/2018 |
| CN | 109245569 | * 1/2019 |

* cited by examiner

*Primary Examiner* — Kyle J Moody

(57) ABSTRACT

A control circuit for a switching converter having a main power switch and an auxiliary power switch, where the control circuit is configured to: charge and discharge a junction capacitor of the main power switch during a turn-off period of the main power switch; and adjust a conduction time of the auxiliary power switch according to a difference between the charged and discharged charge levels across the junction capacitor.

19 Claims, 13 Drawing Sheets

SWITCHING CONVERTER AND CONTROL CIRCUIT THEREOF

RELATED APPLICATIONS

This application claims the benefit of Chinese Patent Application No. 202011467221.1, filed on Dec. 14, 2020, which is incorporated herein by reference in its entirety.

FIELD OF THE INVENTION

The present invention generally relates to the field of power electronics, and more particularly to switching converters and control circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Current switching converters are widely used to rectify AC power, and to provide DC voltage required for the load. The switching converter can include a magnetic element that stores energy when the switch is turned on, and the energy stored in the magnetic element may then be delivered to the load when the switch is turned off. When the switch operates in a hard switch mode, the waveform of the voltage and the waveform of the current can overlap in the conduction process, and thus the turn-on loss may be relatively large. An active clamp circuit can be used in order to recover energy in the magnetic element to improve efficiency.

Typically, the main power switch and auxiliary power switch can alternately be turned on and off in a complementary manner. During the turn-off period of the main power switch, the auxiliary power switch can be turned on, thereby forming an additional absorption circuit to absorb the energy stored in the magnetic element, and suppressing the generation of the spike voltage. Since the main power switch and auxiliary power switch are alternately turned on and off, the detection mode and control methods can be relatively complex. In addition, when the switching converter receives the AC input voltage, the conduction time of the auxiliary power switch may not follow the change of the AC input voltage, which can result in unstable zero voltage switch of the main power switch, thereby affecting the efficiency of the switching converter.

Figure 1:
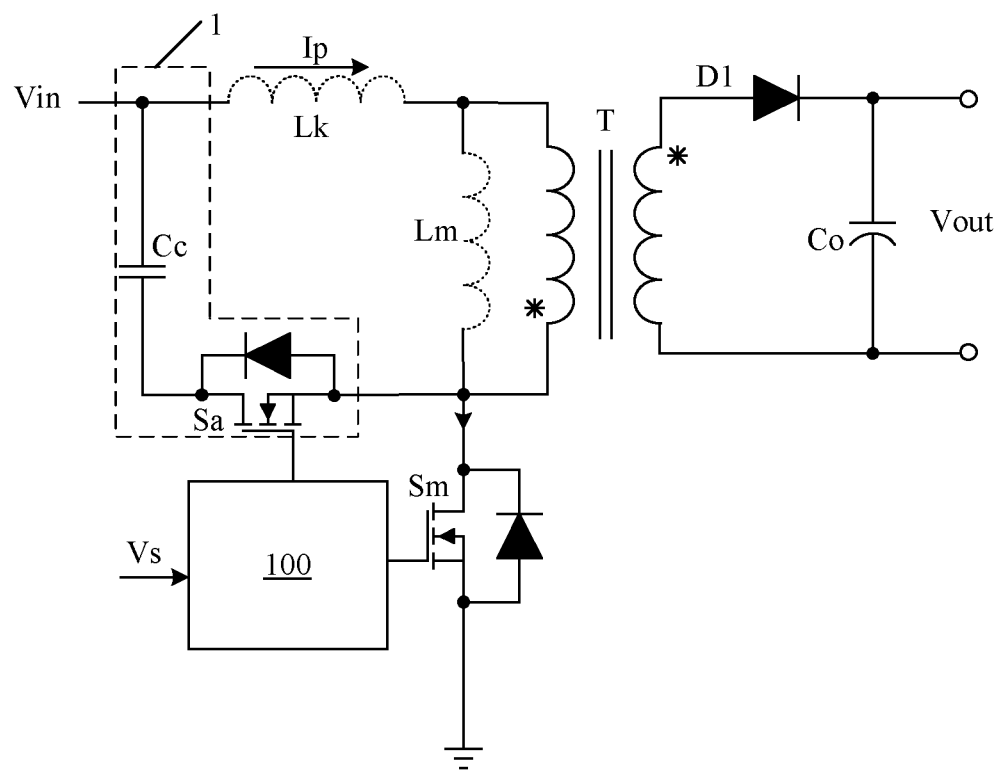
FIG. 1 is a schematic block diagram of a first example switching converter, in accordance with embodiments of the present invention.

Referring now to FIG. 1, shown is a schematic block diagram of a first example switching converter, in accordance with embodiments of the present invention. In this example, the switching converter is a flyback switching converter, including a power stage circuit, clamp circuit 1, and control circuit 100. The power stage circuit can include transformer T, main power switch Sm connected in series with the primary winding of transformer T, and secondary diode D1 and output capacitance Co connected in series with the secondary winding of transformer T. As shown, a non-dotted terminal of the primary winding of transformer T may receive input voltage Vin, a dotted terminal of the primary winding of transformer T can be coupled to a first terminal of main power switch Sm, and a second terminal of main power switch Sm can be coupled to a reference ground of the primary side. A dotted terminal of the secondary winding of transformer T can connect to a first terminal of diode D1.

Output capacitor Co can be coupled between a second terminal of diode D1 and a non-dotted terminal of the secondary winding of transformer T, and the voltage across output capacitor Co can be DC output voltage Vout.

Clamp circuit 1 can connect in series with the main power switch Sm, and in parallel with the primary winding of transformer T, and can include auxiliary power switch Sa and clamp capacitor Cc connected in series with main power switch Sm. By setting the active clamp circuit, the withstand voltage of the main power switch can be reduced, and the range ZVS can be increased, such that the switching converter can be applied to the wide input voltage range. Further, the primary winding of transformer T can be equivalent to magnetizing inductor Lm and leakage inductor Lk connected in series, and the two are shown in dashed lines. According to a variety of implementations, input voltage Vin may be an AC input voltage that is not rectified, such as an alternating current (AC) voltage of 220V, or a DC input voltage.

Control circuit 100 can connect to main power switch Sm and auxiliary power switch Sa for controlling the on and off states of the two switches. During the conduction of main power switch Sm, primary current Ip may flow through the primary winding of transformer T, and primary current Ip can gradually increase within the conduction time of main power switch Sm, and thus transformer T may store energy. Diode D1 connected to the secondary winding of transformer T can be cut off due to reverse bias. During the turn-off period of main power switch Sm, primary current Ip may be reduced to zero, and diode D1 can conduct due to forward bias. Thus, transformer T may release energy to supply power to output capacitor Co and the load.

During the turn-off period of main power switch Sm, auxiliary power switch Sa can be turned on for at least a period of time, such that the clamp circuit starts operating. The energy stored in leakage inductor Lk of transformer T may be released to clamp capacitor Cc through the body diode of auxiliary power switch Sa, thereby suppressing the parasitic oscillation generated by leakage inductor Lk (i.e., suppressing the generation of the spike voltage), in order to improve the electromagnetic interference (EMI) characteristics.

In this particular example control method for the flyback converter, main power switch Sm and auxiliary power switch Sa may not be turned on in a complementary way. In this example, during a turn-off period of the main power switch, a junction capacitor of the main power switch can be charged and discharged, and control circuit 100 may adjust a conduction time of the auxiliary power switch according to a difference between the charged and discharged charge levels across the junction capacitor. Further, sampling signal Vs that represents the voltage change across the junction capacitor (or parasitic capacitor) of main power switch Sm can be generated by a sampling circuit.

Control circuit 100 may receive sampling signal Vs, and can generate the control signal for controlling auxiliary power switch Sa according to sampling signal Vs during the turn-off period of main power switch Sm, in order to adjust the conduction time of auxiliary power switch Sa, such that the junction capacitor of main power switch Sm can be discharged by discharging current before main power switch Sm is turned on. In this way, the voltage between the two power terminals of the main power switch can be reduced when it is turned on, while the leakage inductance energy may be recovered and the EMI improved, such that turn-on loss can be reduced. It will be appreciated that the junction capacitor of main power switch Sm may be the parasitic capacitor of main power switch Sm, or an equivalent capacitor externally connected between the first and second terminals of main power switch Sm.

Since the junction capacitor is non-linear, when the voltage across the junction capacitor is relatively low, the capacitance is relatively large. If main power switch Sm is expected to fully realize a zero-voltage switch, auxiliary power switch Sa may be required to be turned on for a long time, which can result in a large turn-on loss and reduce circuit efficiency. Therefore, a compromise between the efficiency and zero-voltage switch capability of the main power switch can be made. That is, in order to optimize efficiency, it may be necessary to achieve incomplete zero-voltage switch. Thus, the control circuit in certain embodiments can adjust the conduction time of the auxiliary power switch according to a difference between the charged and discharged charge levels across the junction capacitor, such that the drain voltage of the main power switch can reach a preset value to optimize the circuit performance.

Control circuit 100 can utilize various forms of sampling circuits to detect the voltage change across the junction capacitor, in order to obtain the amount of charge change on the junction capacitor, and to adjust the conduction time of auxiliary power switch Sa according to the difference between the charged and discharged charge levels across the junction capacitor. For example, during the turn-off period of main power switch Sm, when the charging charge level of the junction capacitor is greater than the discharging charge level of the junction capacitor, it can indicate that the junction capacitor is not completely discharged before main power switch Sm is turned on, and thus the zero-voltage switch is not realized. Therefore, control circuit 100 may need to increase the conduction time of auxiliary power switch Sa to increase the amount of discharging charge of the junction capacitor. When the charging charge level of the junction capacitor is less than the discharging charge level of the junction capacitor, although the zero-voltage switch of main power switch Sm is realized, the junction capacitor may discharge too much, resulting in a relatively high power consumption of the circuit system. Thus, control circuit 100 can reduce the conduction time of auxiliary power switch Sa. When the charging charge level of the junction capacitor is equal to the discharging charge level of the junction capacitor, this can indicate that the zero-voltage switch is realized, and control circuit 100 can maintain the conduction time of the auxiliary power switch as unchanged.

In particular embodiments, control circuit 100 can generate a detection signal representing the difference between the charged and discharged charge levels across the junction capacitor during the turn-off period of main power switch Sm according to sampling signal Vs and the driving signal for controlling main power switch Sm. Control circuit 100 can also adjust the conduction time of auxiliary power switch Sa according to the detection signal, in order to reduce the voltage between the two power terminals of the main power switch when it is turned on. In this example, the control circuit may utilize a closed loop control method, and the conduction time of auxiliary power switch Sa can be adaptively adjusted to continuously change according to the principle of charge conservation. As such, the control method is relatively simple, a fast response is realized, and it is applicable to a wide range of AC input voltages or DC input voltages. In particular embodiments, the power stage circuit of the switching converter may be any suitable converter topologies (e.g., BUCK, BUCK-BOOST, etc.), and is not limited to the FLYBACK converter topology as shown. According to different topological structures, the magnetic element can be an inductor, and is not limited to the transformer that is shown.

Figure 2:
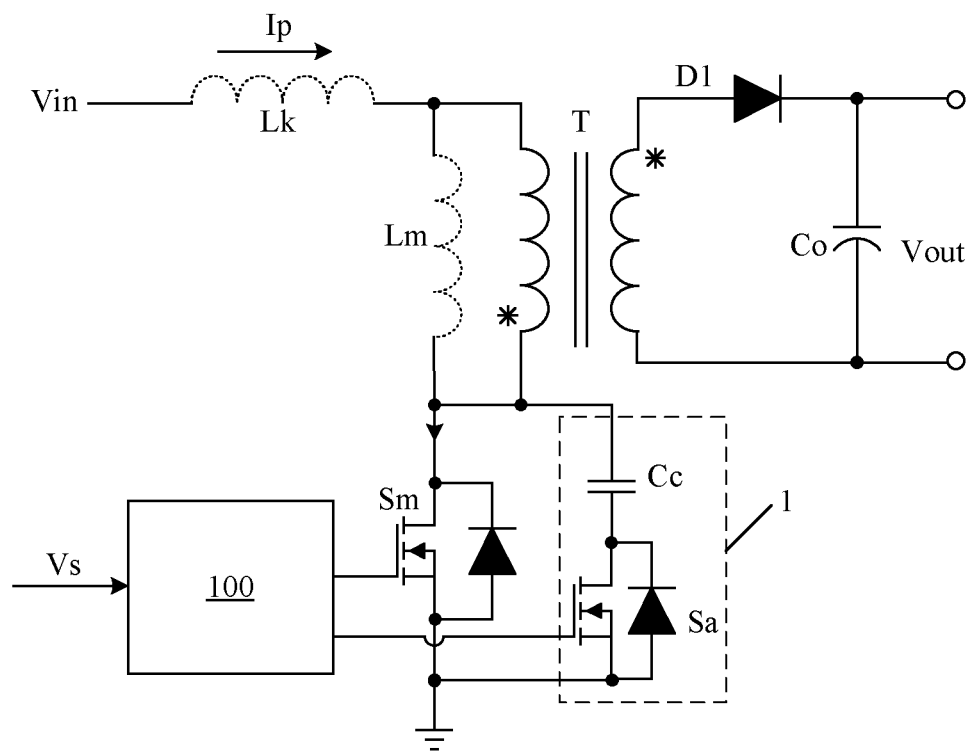
FIG. 2 is a schematic block diagram of a second example switching converter, in accordance with embodiments of the present invention.

Referring now to FIG. 2, shown is a schematic block diagram of a second example switching converter, in accordance with embodiments of the present invention. In this example, the switching converter is a flyback switching converter, and can include a power stage circuit, clamp circuit 1, and control circuit 100. Clamp circuit 1 can connect in parallel with main power switch Sm, and may include auxiliary power switch Sa and clamp capacitor Cc connected in series between a first terminal and a second terminal of main power switch Sm. Control circuit 100 can connect to main power switch Sm and auxiliary power switch Sa for controlling the on and off states of the two switches. The power stage circuit, control circuit, and control method of the second example switching converter in FIG. 2 may be substantially the same as those of the first example switching converter shown in FIG. 1.

Figure 3:
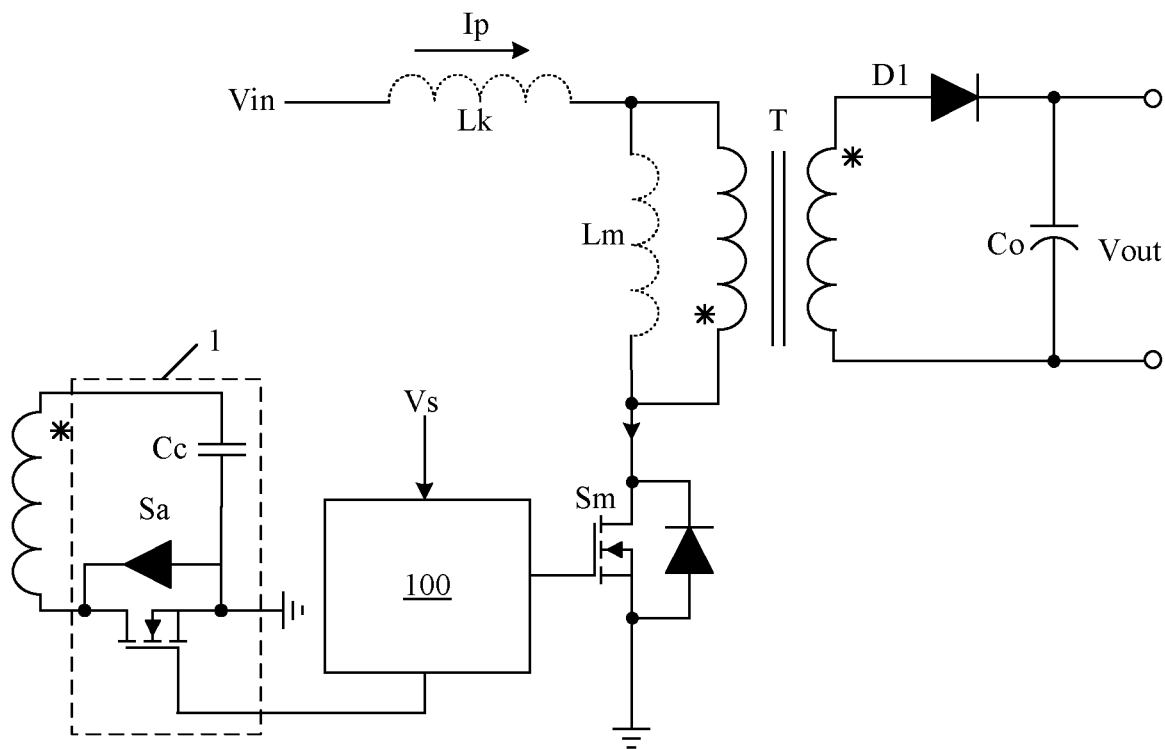
FIG. 3 is a schematic block diagram of a third example switching converter, in accordance with embodiments of the present invention.

Referring now to FIG. 3, shown is a schematic block diagram of a third example switching converter, in accordance with embodiments of the present invention. In this example, the switching converter is a flyback switching converter, and can include a power stage circuit, clamp circuit 1, and control circuit 100. In this particular example, the switching converter may also include an auxiliary winding coupled to the primary winding of the transformer. Clamp circuit 1 can connect in parallel with the auxiliary winding, and may include auxiliary power switch Sa and clamp capacitor Cc connected in series between a first terminal and a second terminal of the auxiliary winding. Control circuit 100 can connect to main power switch Sm and auxiliary power switch Sa for controlling the on and off states of the two switches. The power stage circuit, control circuit, and control method of the third example switching converter may be substantially the same as those of the first example switching converter.

Figure 4:
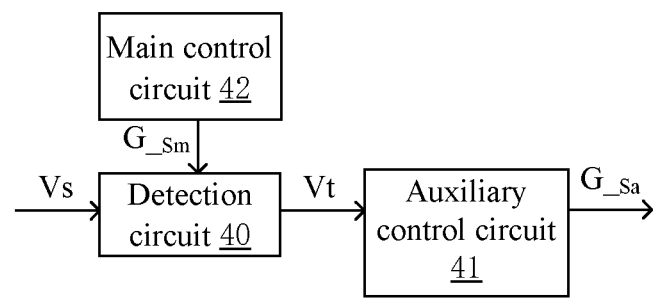
FIG. 4 is a schematic block diagram of an example control circuit, in accordance with embodiments of the present invention.

Referring now to FIG. 4, shown is a schematic block diagram of an example control circuit, in accordance with embodiments of the present invention. In this example, the control circuit can include detection circuit 40 and auxiliary control circuit 41. Detection circuit 40 may receive sampling signal Vs that represents the voltage change across the junction capacitor of the main power switch, and can generate detection signal Vt that represents the difference between the charged and discharged charge levels across the junction capacitor during the turn-off period of main power switch Sm according to the driving signal for main power switch Sm. Auxiliary control circuit 41 can adjust the conduction time of auxiliary power switch Sa based on detection signal Vt, thereby reducing the turn-on loss of the main power switch and improving system efficiency. In one example, auxiliary control circuit 41 can generate an error signal based on the error between detection signal Vt and a reference signal, and can adjust the conduction time of auxiliary power switch Sa based on the change of the error signal, thereby reducing the voltage between the two power terminals of the main power switch when it is turned on. For example, when the error signal is increased, auxiliary control circuit 41 can increase the conduction time of auxiliary power switch Sa, and when the error signal is decreased, auxiliary control circuit 41 may decrease the conduction time of auxiliary power switch Sa, such that the conduction time of the auxiliary power switch can be dynamically adjusted, and thus the zero-voltage switch of the main power switch can be accurately achieved.

In particular embodiments, the switching converter can include a sampling circuit configured to generate sampling signal Vs that represents the voltage change across the junction capacitor of the main power switch. Since the junction capacitor may be charged and discharged during different stages, the voltage across the junction capacitor can change, and according to the charge balance principle, charge amount Q of the junction capacitor can be represented as follows: $Q = C_{DS} * V_{DS}$, where $C_{DS}$ is the capacitance value of the junction capacitor, $V_{DS}$ is the voltage across the junction capacitor. Therefore, control circuit 100 can obtain the amount of charge change on the junction capacitor according to sampling signal Vs. Then, detection circuit 40 may receive sampling signal Vs during the turn-off period of main power switch Sm to generate detection signal Vt that characterizes the difference between the charged and discharged charge levels across the junction capacitor during the turn-off period of the main power switch. Auxiliary control circuit 41 may adjust driving signal G_sa based on the error signal that characterizes the error between detection signal Vt and the reference signal, in order to adjust the conduction time of auxiliary power switch Sa. In this example, control circuit 100 can also include a main control circuit for generating driving signal $G_{\_Sm}$ for controlling the switching states of the main power switch. Depending on the particular application of the switching converter, any suitable control mode (e.g., constant conduction time control, peak current control mode, etc.) of main power switch Sm can be supported in certain embodiments.

Figure 5:
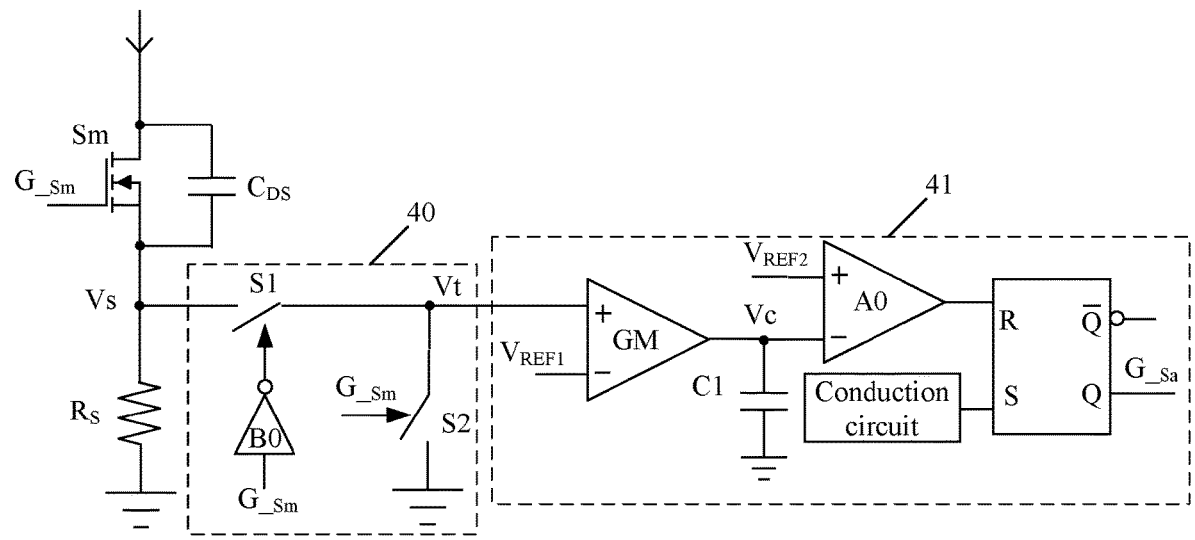
FIG. 5 is a schematic block diagram of a first example control circuit, in accordance with embodiments of the present invention.

Referring now to FIG. 5, shown is a schematic block diagram of a first example control circuit, in accordance with embodiments of the present invention. In this example, junction capacitor $C_{DS}$ can connect between the drain and the source terminals of main power switch Sm. A first terminal of sampling resistor Rs can connect to the source of main power switch Sm, and a second terminal of sampling resistor Rs can connect to the reference ground. Sampling resistor Rs may obtain sampling signal Vs at its first terminal by sampling the current flowing through junction capacitor $C_{DS}$. Detection circuit 40 can include switches S1 and S2 controlled by driving signal $G_{\_Sm}$ for the main power switch, where the switching states of switches S1 and S2 are complementary. For example, switch S1 can be controlled by an inverted driving signal $G_{\_Sm}$ through inverter B0, and switch S2 can be directly controlled by driving signal $G_{\_Sm}$. When driving signal $G_{\_Sm}$ is inactive, main power switch Sm can be turned off, and thus switch S1 can be turned on, switch S2 can be turned off, and detection circuit 40 may receive sampling signal Vs to generate detection signal Vt.

In this example, auxiliary control circuit 41 can include error amplifier GM and comparator A0. A non-inverting input terminal of error amplifier GM may receive detection signal Vt, an inverting input terminal may receive reference signal $V_{REF1}$, and error signal Vc can be generated by amplifying the error between detection signal Vt and reference signal $V_{REF1}$. Further, capacitor C1 can be coupled to the output terminal of error amplifier GM for compensating the output signal of error amplifier GM to generate error signal Vc. Also, a non-inverting input terminal of comparator A0 may receive reference signal $V_{REF2}$, an inverting input terminal may receive error signal Vc, and the conduction time of auxiliary power switch Sa can be adjusted by comparing error signal Vc against reference signal $V_{REF2}$.

In one example, auxiliary control circuit 41 can also include a conduction circuit and an RS flip-flop. The conduction circuit can connect to a set terminal of the RS flip-flop, configured to generate a set signal to control the RS flip-flop to activate driving signal $G_{\_Sa}$ to control auxiliary power switch Sa to be turned on. The reset terminal of the RS trigger can connect to the output terminal of comparator A0, and can control auxiliary power switch Sa to be turned off according to the comparison result of comparator A0, thereby adjusting the conduction time of auxiliary power switch Sa. It should be understood that the conduction circuit can set the conduction time of the auxiliary power switch according to the particular application environment of the switching converter. For example, the conduction circuit can control the auxiliary power switch to be turned on after the main power switch is turned off for a preset time.

In order to control the main power switch to achieve a complete zero-voltage switch, and to reduce circuit power consumption, control circuit 100 may adjust the charging charge of the junction capacitor to be equal to the discharging charge of the junction capacitor during the turn-off period of the main power switch. Thus reference signal $V_{REF1}$ can connect to the reference ground in this example. Further, reference signal $V_{REF2}$ can be generated by a reference signal generation circuit. For example, reference signal $V_{REF2}$ can be a ramp signal, and the reference signal generation circuit can control a current source to charge a capacitor to generate the ramp signal when the auxiliary power switch is turned on. Further, auxiliary control circuit 41 can control the auxiliary power switch to be turned off when the ramp signal rises to error signal Vc. It should be understood that the above reference voltage generation circuit is only one of the suitable circuit structures to generate the above reference signal, and other circuit structure that can generate the reference signal can also be supported in certain embodiments.

Figure 6:
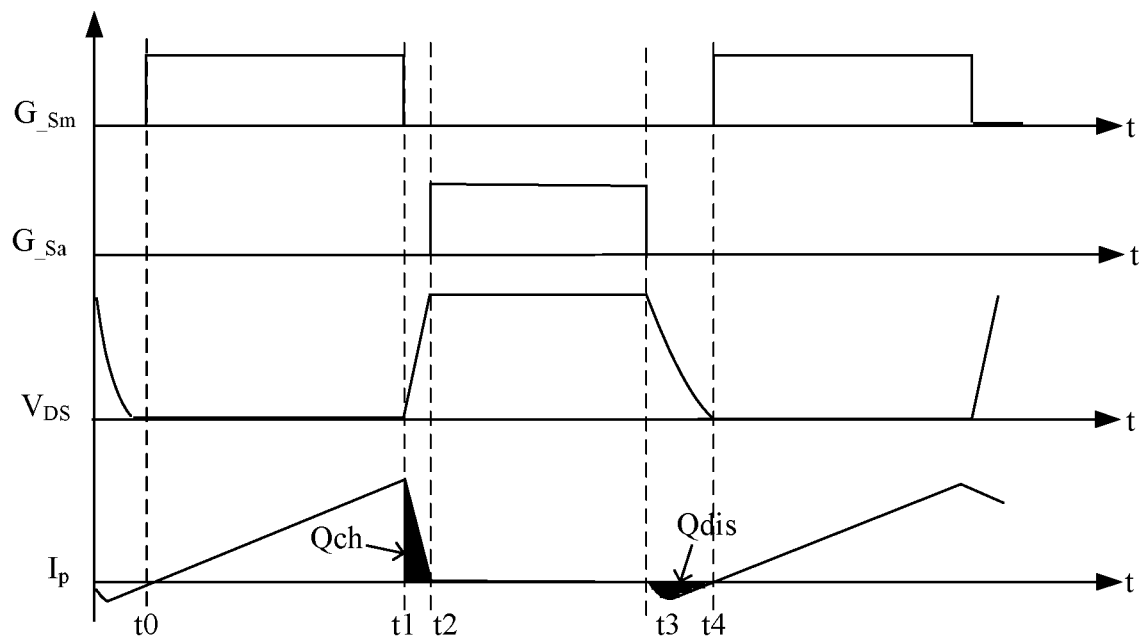
FIG. 6 is a waveform diagram of example operation of the switching converter, in accordance with embodiments of the present invention.

Referring now to FIG. 6, shown is a waveform diagram of example operation of the switching converter, in accordance with embodiments of the present invention. In this example, the switching converter is a flyback switching converter. As shown, at time t0, driving signal $G_{\_SM}$ can be active, so the main power switch may be turned on, and the primary winding can be excited by the input voltage, such that primary current $I_{\_Sm}$ increases linearly from zero, and there may be no current flowing through the secondary winding. At time t1, main power switch Sm can be turned off, and auxiliary power switch Sa can also be turned off, thereby entering the dead zone. At this time, primary current $I_{\_Sm}$ may need to freewheel. Primary current $I_{\_Sm}$ can charge junction capacitor $C_{DS}$ of main power switch Sm, and thus voltage $V_{DS}$ across junction capacitor $C_{DS}$ may gradually increase. When voltage $V_{DS}$ across junction capacitor $C_{DS}$ reaches a certain value, the body diode of auxiliary power switch Sa can conduct, and primary current $I_{\_Sm}$ can charge clamp capacitor Cc through the body diode of auxiliary power switch Sa. During this process, the magnetizing inductor and clamp capacitor Cc can be resonant.

At time t2, driving signal $G_{\_Sa}$ for auxiliary power switch Sa can be active, so auxiliary power switch Sa may be turned on, such that primary current $I_{\_Sm}$ can decrease to zero. During the conduction time of auxiliary power switch Sa, the energy stored in leakage inductor Lk of the transformer may be released to clamp capacitor Cc through the body diode of auxiliary power switch Sa. At time t3, driving signal $G_{\_Sa}$ can be active, and then auxiliary power switch Sa may be turned off, such that the energy stored in leakage inductor Lk and magnetizing inductor Lm may release to discharge junction capacitor $C_{DS}$, and primary current $I_{\_Sm}$ can be inverse. The resonance amplitude of magnetizing inductance Lm and junction capacitor $C_{DS}$ can correspond to the value of the negative current of the magnetizing inductor when auxiliary switch power Sa is turned off. The resonance amplitude can be relatively large when the value of the negative current is relatively large, such that the decreasing amplitude of the drain-source voltage of main power switch Sm (e.g., voltage $V_{DS}$) can be relatively large, thereby achieving zero-voltage switch of main power switch Sm. At time t4, the voltage across junction capacitor $C_{DS}$ may drop to zero. At this time, driving signal $G_{\_Sm}$ to be active and main power switch Sm may be controlled to be turned on, thereby achieving a zero-voltage switch.

In this example, charging charge amount Qch (shown in the shaded portion) and discharging charge amount Qdis (shown in the shaded portion) of the junction capacitor of main power switch Sm can be detected by the control circuit during the turn-off period of main power switch Sm, in order to adjust the conduction time of auxiliary power switch Sa. When charging charge amount Qch is equal to discharging charge amount Qdis, a zero-voltage switch of main power switch Sm can be realized, and the efficiency and performance are both optimal. When charging charge amount Qch is less than discharging charge amount Qdis, although the zero-voltage switch of main power switch Sm is realized, the junction capacitor of main power switch Sm may discharge too much energy, such that the conduction time of auxiliary power switch Sa needs to be reduced. When charging charge amount Qch is greater than discharging charge amount Qdis, the zero-voltage switch of main power switch Sm may not be realized, such that the conduction time of auxiliary power switch Sa needs to be increased to increase discharging charge amount Qdis.

Figure 7:
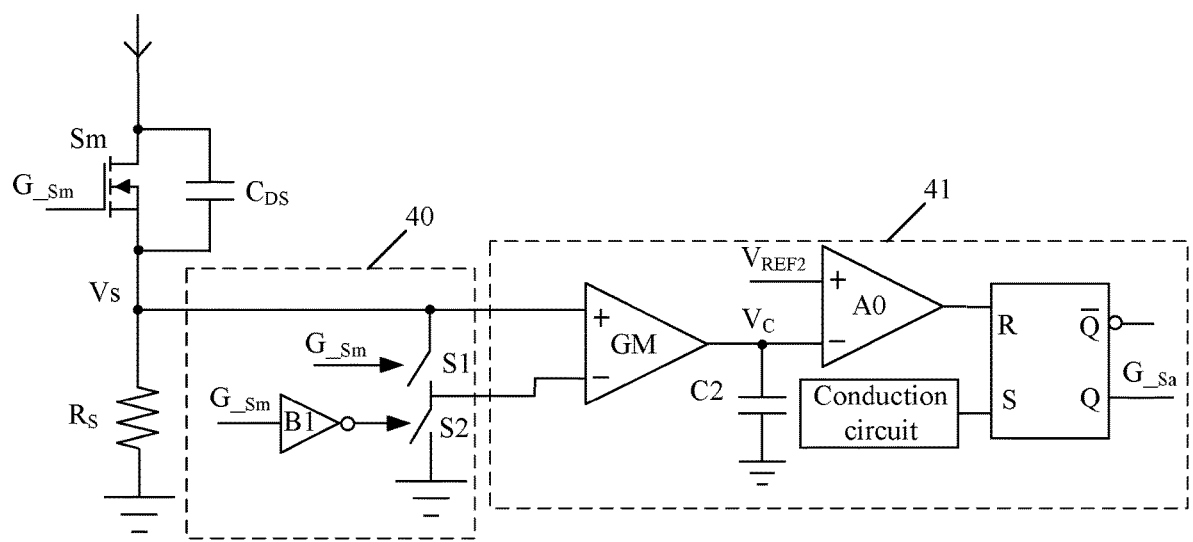
FIG. 7 is a schematic block diagram of a second example control circuit, in accordance with embodiments of the present invention.
Figure 8:
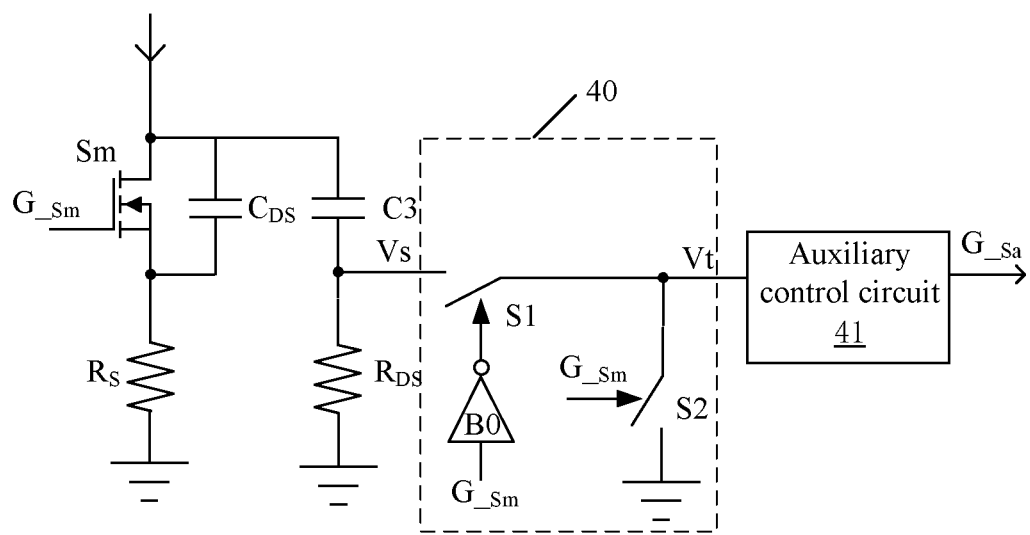
FIG. 8 is a schematic block diagram of a third example control circuit, in accordance with embodiments of the present invention.

It should be understood that the sampling circuit and the detection circuit are not limited to the above embodiments, and a variety of implementations can be used, e.g., as shown in FIGS. 7 and 8. Referring now to FIG. 7, shown is a schematic block diagram of a second example control circuit, in accordance with embodiments of the present invention. In this example, detection circuit 40 can include switches S1 and S2 connected in series, where the switching states of switches S1 and S2 are complementary. Switches S1 and S2 can connect in series between sampling signal Vs and the reference ground. Switch S1 may be directly controlled by driving signal $G_{\_Sm}$, and switch S2 can be controlled by inverted driving signal $G_{\_Sm}$ through inverter B1. When driving signal $G_{\_Sm}$ is active, main power switch Sm can be turned on, switch S1 may be turned on, and switch S2 may be turned off, such that the two input terminals of error amplifier GM in auxiliary control circuit 41 are connected with each other, and thus auxiliary control circuit 41 may not operate.

When main power switch Sm is turned off, switch S1 can be turned off, switch S2 may be turned on, and sampling signal Vs can be directly used as the detection signal. For example, the non-inverting input terminal of error amplifier GM may receive sampling signal Vs, and the inverting input terminal can connect to the reference ground through switch S2. Therefore, auxiliary control circuit 41 can adjust the conduction time of auxiliary power switch Sa based on error signal Vc characterizing the error between the detection signal and the reference ground. It will be appreciated that those skilled in the art can construct different detection circuits by simple deformation to generate a detection signal that represents the change rate of the voltage across the junction capacitor during the turn-off period of the main power switch, and adjusts the conduction time of the auxiliary power switch according to the detection signal.

Referring now to FIG. 8, shown is a schematic block diagram of a third example control circuit, in accordance with embodiments of the present invention. In this example, sampling circuit 80 can connect to a power terminal (e.g., drain) of main power switch Sm. Detection circuit 40 and auxiliary control circuit 41 can be substantially the same as those of the above example. Sampling circuit 80 can connect between the first terminal of the main power switch and the reference ground, in order to be connected in parallel with junction capacitor $C_{DS}$ and sampling resistor Rs connected in series, in order to sample the voltage change across junction capacitance $C_{DS}$. In this example, sampling circuit 80 can include capacitor C3 and resistor $R_{DS}$ connected in series. For example, a first terminal of capacitor C3 can connect to the first terminal of junction capacitor $C_{DS}$, a second terminal of capacitor C3 can connect to a first terminal of resistor $R_{DS}$, and a second terminal of resistor $R_{DS}$ can connect to the reference ground.

The sampling circuit can generate sampling signal Vs that characterizes the voltage change across junction capacitor $C_{DS}$ at the common node of capacitor C3 and resistor $R_{DS}$. Detection circuit 40 can generate detection signal Vt representing the difference between the charged and discharged charge levels across junction capacitor $C_{DS}$ during the turn-off period of the main power switch according to sampling signal $V_{DS}$. Then, auxiliary control circuit 41 can adjust driving signal $G_{\_Sa}$ for auxiliary power switch Sa according to detection signal Vt, thereby adjusting the conduction time of auxiliary power switch Sa. It should be understood that the sampling circuit in this example adopts a differential circuit to generate sampling signal Vs that characterizes the voltage change on the junction capacitor, and other structures that can realize the above functions can be used in certain embodiments. In addition, the sampling position of the sampling circuit can be flexibly adjusted according to the topology of the switching converter, and is not limited to the power terminal that samples the inflowing current of the main power switch in the above-mentioned example.

For the optimal efficiency, zero-voltage switch may not be required to be completely realized. The control circuit of certain embodiments can control the drain-source voltage of the main power switch to reach a preset value when it is turned on according to the difference between the charged and discharged charge levels across the junction capacitor. For example, the control circuit can control the sampling time of detection circuit 40 to reduce the detection value of the charging charge of the junction capacitor, such that the voltage across the junction capacitor may not completely decrease to zero when the main power switch is turned on by adjusting the conduction time control of the auxiliary power switch. In particular embodiments, the detection circuit can detect the charge amount of the junction capacitor according to sampling signal Vs after a preset time when main power switch Sm is turned off, and may generate detection signal Vt (see, e.g., FIG. 9). In another example, the detection circuit can detect the charge amount of the junction capacitor when the voltage across the junction capacitor reaches a threshold voltage and generates detection signal Vt (see, e.g., FIG. 10).

Figure 9:
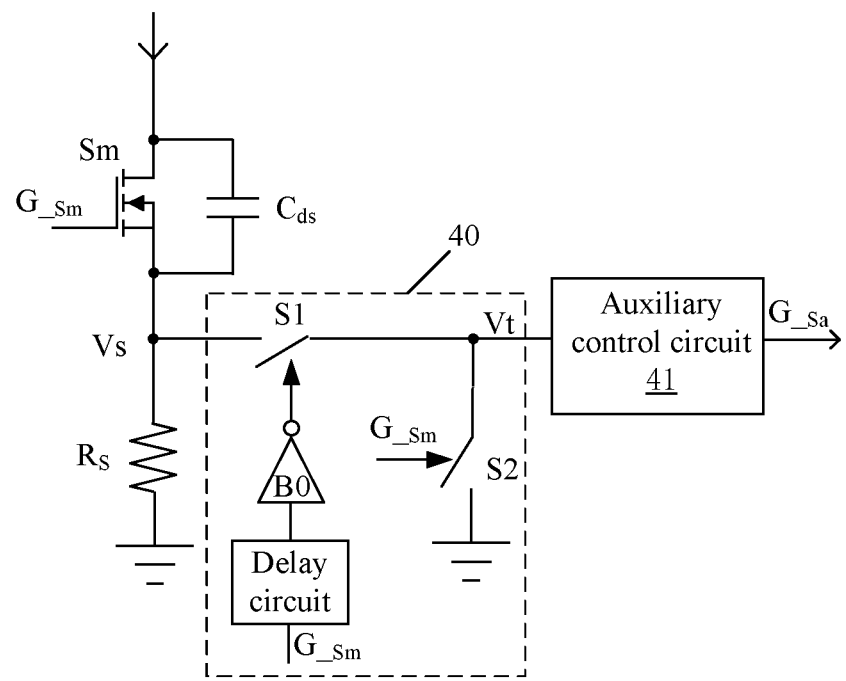
FIG. 9 is a schematic block diagram of a fourth example control circuit, in accordance with embodiments of the present invention.

Referring now to FIG. 9, shown is a schematic block diagram of a fourth example control circuit, in accordance with embodiments of the present invention. In this example, detection circuit 40 can include switch S1, switch S2, and a delay circuit. The switching states of switches S1 and S2 may be complementary. Further, driving signal $G_{\_Sm}$ may be inverted by invertor B0 and can be delayed by the delay circuit to generate a signal to control switch S1. Switch S2 can be directly controlled by driving signal $G_{\_Sm}$. When driving signal $G_{\_Sm}$ is inactive, switch S2 can be turned off, and switch S1 may be turned on after the delay time generated by the delay circuit has elapsed to delay the detection moment of detection circuit 40, thereby shortening the detection time of the charging charge amount of junction capacitor $C_{DS}$. Detection circuit 40 may generate detection signal Vt according to sampling signal Vs after main power switch Sm is turned off for a preset time. Auxiliary control circuit 41 can adjust driving signal $G_{\_Sa}$ for auxiliary power switch Sa according to detection signal Vt, in order to adjust the conduction time of auxiliary power switch Sa.

Figure 10:
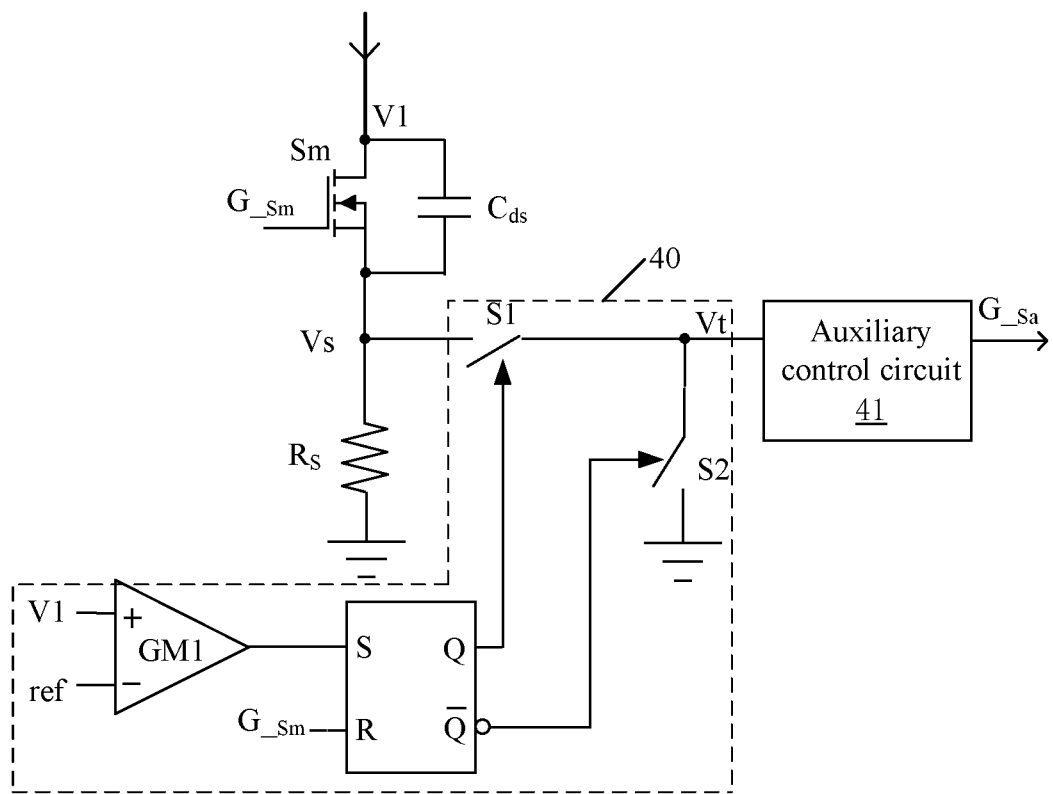
FIG. 10 is a schematic block diagram of a fifth example control circuit, in accordance with embodiments of the present invention.

Referring now to FIG. 10, shown is a schematic block diagram of a fifth example control circuit, in accordance with embodiments of the present invention. In this example, detection circuit 40 can include switch S1, switch S2, error amplifier GM1, and an RS flip-flop, where the switching states of switches S1 and S2 are complementary. A non-inverting input terminal of error amplifier GM1 may receive voltage V1 at the first terminal of junction capacitor $C_{DS}$, and an inverting input terminal may receive threshold voltage REF. The set terminal of the RS flip-flop can connect to the output terminal of error amplifier GM1, the reset terminal of the RS flip-flop may receive driving signal $G_{\_Sm}$ for the main power switch, and the output terminal of the RS flip-flop can control the on and off states of switches S1 and S2. During the turn-off period of the main power switch, when voltage V1 reaches threshold voltage ref, switch S1 can be turned on, switch S2 may be turned off, and then detection circuit 40 can generate detection signal Vt according to sampling signal Vs. Auxiliary control circuit 41 can adjust driving signal $G_{\_Sa}$ for auxiliary power switch Sa according to detection signal Vt, in order to adjust the conduction time of auxiliary power switch Sa.

Figure 11A:
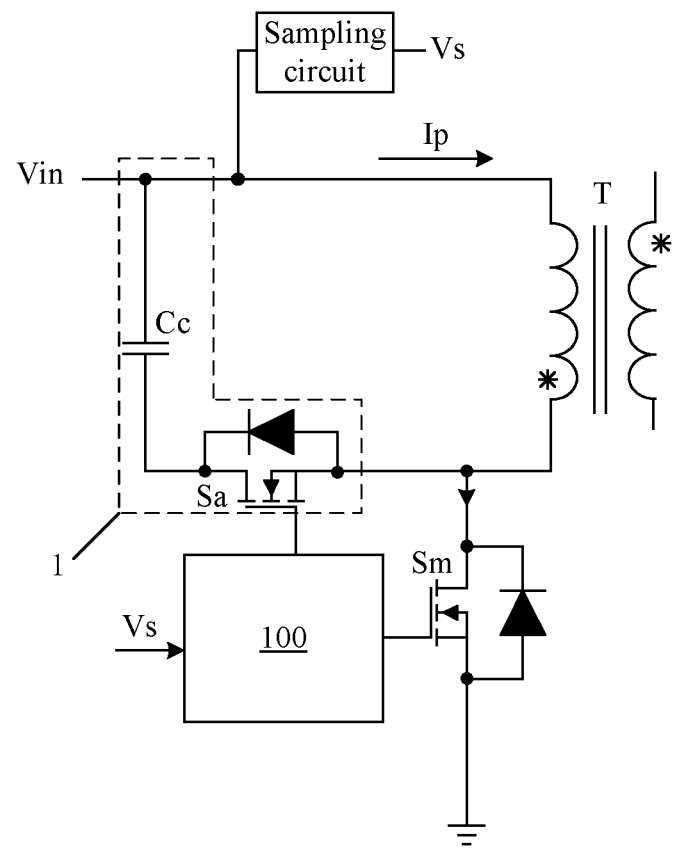
FIG. 11A is a schematic block diagram of a fourth example switching converter, in accordance with embodiments of the present invention.
Figure 11B:
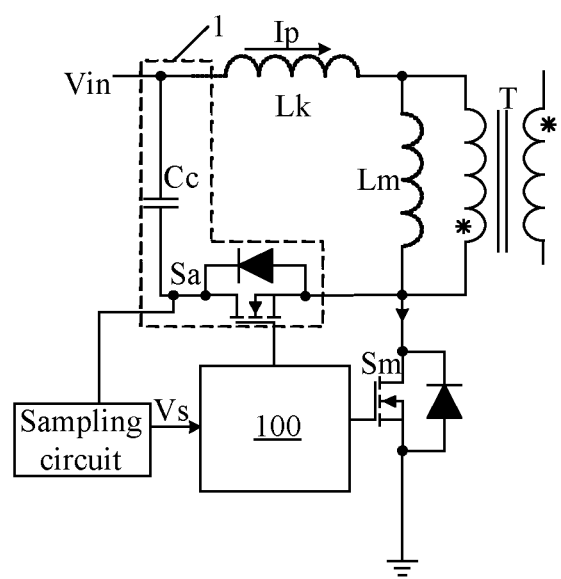
FIG. 11B is a schematic block diagram of a fifth example switching converter, in accordance with embodiments of the present invention.
Figure 11C:
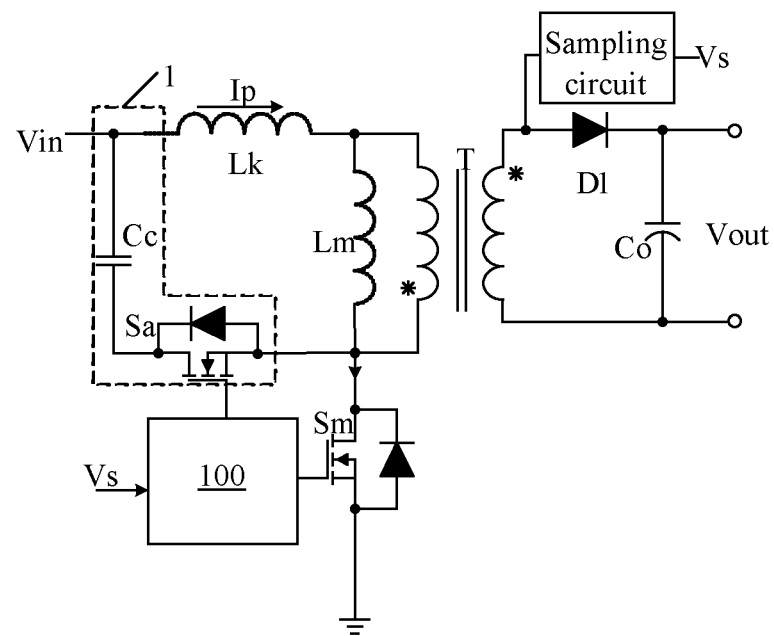
FIG. 11C is a schematic block diagram of a sixth example switching converter, in accordance with embodiments of the present invention.

As described above, the sampling position of the sampling circuit in the of the present invention is not limited to the above-mentioned embodiment. The voltage change across the junction capacitor of the main power switch can be sampled at different nodes according to the operating principle of the switching converter, as shown in FIGS. 11A, 11B, and 11C. Referring now to FIG. 11A, shown is a schematic block diagram of a fourth example switching converter, in accordance with embodiments of the present invention. In this particular example, the sampling circuit can connect to one terminal of the magnetic element (e.g., primary winding of the transformer) for sampling the voltage change across the magnetic element. Since the current flowing through the junction capacitor of the main power switch is equal to the current flowing through the primary winding of the transformer during the turn-off period of main power switch Sm, the sampling circuit can directly sample the voltage change of the primary winding of the transformer to obtain sampling signal Vs that represents the voltage change across the junction capacitor of the main power switch.

Referring now to FIG. 11B, shown is a schematic block diagram of a fifth example switching converter, in accordance with embodiments of the present invention. In this particular example, the sampling circuit can connect to one power terminal of auxiliary switch Sa for sampling the voltage change across auxiliary switch Sa. Since the charging current and discharging current flowing through the junction capacitor of the main power switch flow through the auxiliary switch Sa during the turn-off period of the main power switch Sm, the sampling circuit can directly sample the voltage change across auxiliary switch Sa to obtain sampling signal Vs that represents the voltage change across the junction capacitor of the main power switch.

Referring now to FIG. 11C, shown is a schematic block diagram of a sixth example switching converter, in accordance with embodiments of the present invention. In this particular example, the sampling circuit can connect to one terminal of secondary diode D1 for sampling the voltage change across secondary diode D1. Since secondary diode D1 connected to the secondary winding can be turned on due to the forward bias during the turn-off period of main power switch Sm, the current flowing through secondary diode D1 may be proportional to the current flowing through the junction capacitor of the main power switch. Therefore, the sampling circuit can directly sample the voltage change across secondary diode D1 to obtain sampling signal Vs that characterizes the voltage change across the junction capacitor of the main power switch.

In particular embodiments, the control circuit can detect the difference between the charged and discharged charge levels across the junction capacitor during the turn-off period of the main power switch to generate a detection signal, and may adjust the conduction time of the auxiliary power switch according to the error between the detection signal and the reference signal. This can reduce the voltage between the two power terminals of the main power switch when it is turned on, while also recovering the leakage inductance energy and improving electromagnetic interference. In particular embodiments, the control circuit may adopt a closed loop control method, and the conduction time of the auxiliary power switch can be adaptively adjusted to be continuously changed by utilizing the principle of charge conservation, such that a relatively simple control mode and fast response can be achieved, and that is suitable for wide-range AC input voltages or DC input voltages.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for a switching converter having a main power switch and an auxiliary power switch, wherein the control circuit is configured to:
    a) charge and discharge a junction capacitor of the main power switch during a turn-off period of the main power switch;
    b) adjust a conduction time of the auxiliary power switch according to a difference between charged and discharged charge levels across the junction capacitor; and
    c) a detection circuit configured to receive a sampling signal that represents a voltage change across the junction capacitor, and to generate a detection signal that represents the difference between the charged and discharged charge levels across the junction capacitor according to driving signal for the main power switch.

2. The control circuit according to claim 1, wherein:
    a) when the charged charge level across the junction capacitor is greater than the discharged charge level across the junction capacitor, the control circuit is configured to increase the conduction time of the auxiliary power switch;
    b) when the charged charge level across the junction capacitor is less than the discharged charge level across the junction capacitor, the control circuit is configured to reduce the conduction time of the auxiliary power switch; and
    c) when the charged charge level across the junction capacitor is equal to the discharged charge level across the junction capacitor, the control circuit is configured to maintain the conduction time of the auxiliary power switch as unchanged.

3. The control circuit according to claim 1, further comprising an auxiliary control circuit configured to generate a driving signal for the auxiliary power switch, and generate an error signal based on the detection signal and a first reference signal, in order to adjust the conduction time of the auxiliary power switch.

4. The control circuit according to claim 3, wherein the auxiliary control circuit is configured to:
    a) increase the conduction time of the auxiliary power switch when the error signal increases; and
    b) decrease the conduction time of the auxiliary power switch when the error signal decreases.

5. The control circuit according to claim 3, wherein the auxiliary control circuit comprises an error amplifier having a first input terminal for receiving the detection signal, a second input terminal for receiving the first reference signal, and an output terminal for generating the error signal.

6. The control circuit according to claim 3, wherein the auxiliary control circuit further comprises a comparison circuit having a first input terminal for receiving the error signal, and a second input terminal for receiving a second reference signal, and being configured to adjust the conduction time of the auxiliary power switch by comparing the error signal against the second reference signal.

7. The control circuit according to claim 1, wherein the switching converter comprises:
    a) a magnetic element coupled to the main power switch; and
    b) a sampling circuit configured to generate a sampling signal that characterizes the voltage change across the junction capacitor.

8. The control circuit according to claim 7, wherein the sampling circuit is coupled to a power terminal of the main power switch, and the sampling circuit is configured to sample a voltage change across the junction capacitor to generate the sampling signal.

9. The control circuit according to claim 7, wherein the sampling circuit is coupled to a terminal of the magnetic element, and the sampling circuit is configured to sample a voltage change across the magnetic element to generate the sampling signal.

10. The control circuit according to claim 7, wherein the sampling circuit is coupled to a power terminal of the auxiliary power switch, and the sampling circuit is configured to sample a voltage change across the auxiliary power switch to generate the sampling signal.

11. The control circuit according to claim 7, wherein the switching converter comprises a secondary diode, the sampling circuit is coupled to a terminal of the secondary diode, and the sampling circuit is configured to sample a voltage change across the secondary diode secondary diode to generate the sampling signal.

12. The control circuit according to claim 7, wherein the sampling circuit comprises a sampling resistor having a first terminal coupled to a power terminal of the main power switch, and a second terminal coupled to a reference ground, wherein the sampling signal is generated at the first terminal of the sampling resistor by sampling the current flowing through the junction capacitor.

13. The control circuit according to claim 7, wherein the sampling circuit comprises a capacitor and a resistor connected in series, and the sampling signal is generated at a common connection point of the capacitor and the resistor.

14. The control circuit according to claim 1, wherein the detection circuit comprises:
   a) a first switch having a first terminal for receiving the sampling signal, and that is turned on during the turn-off period of the main power switch; and
   b) a second switch having a first terminal coupled to a second terminal of the first switch, and a second terminal coupled to a reference ground, wherein the second switch is turned on during the conduction period of the main power switch, and the detection signal is generated at a common node of the first switch and the second switch.

15. The control circuit according to claim 1, wherein the detection circuit comprises a first switch having a first terminal for receiving the sampling signal, wherein the sampling signal is configured as the detection signal during the turn-off period of the main power switch.

16. The control circuit according to claim 1, wherein the detection circuit is configured to generate the detection signal according to the sampling signal after the main power switch is turned off for a predetermined time.

17. The control circuit according to claim 1, wherein the detection circuit is configured to generate the detection signal according to the sampling signal when a voltage across the junction capacitor reaches a threshold voltage.

18. The switching converter, comprising the control circuit of claim 1, and further comprising:
   a) a power stage circuit having the main power switch to control energy storage and transmission of a magnetic component; and
   b) a clamp circuit having an auxiliary power switch.

19. The switching converter according to claim 18, wherein the clamp circuit is connected in series with the main power switch, and comprises the auxiliary power switch and a clamp capacitor connected in series between an input terminal of the switching converter and the main power switch.

* * * * *